(12) United States Patent
Boo

(10) Patent No.: US 12,099,915 B2
(45) Date of Patent: Sep. 24, 2024

(54) METHOD AND APPARATUS FOR QUANTIZING DEEP NEURAL NETWORK

(71) Applicant: REBELLIONS INC., Seongnam-si (KR)

(72) Inventor: Yoonho Boo, Suwon-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 17/659,067

(22) Filed: Apr. 13, 2022

(65) Prior Publication Data

US 2022/0398430 A1 Dec. 15, 2022

(30) Foreign Application Priority Data

Jun. 9, 2021 (KR) .......................... 10-2021-0074511

(51) Int. Cl.
*G06N 3/04* (2023.01)
*G06N 3/08* (2023.01)

(52) U.S. Cl.
CPC ................. *G06N 3/04* (2013.01); *G06N 3/08* (2013.01)

(58) Field of Classification Search
CPC ........... G06N 3/04; G06N 3/08; G06N 3/0495
See application file for complete search history.

(56) References Cited

U.S. PATENT DOCUMENTS

2021/0224658 A1* 7/2021 Mathew ............... G06N 3/0481

FOREIGN PATENT DOCUMENTS

KR   10-2375896 B1   3/2022

OTHER PUBLICATIONS

Li et al., "Additive Powers-of-Two Quantization: An Efficient Non-Uniform Discretization for Neural Networks", Feb. 2, 2020, arXiv:1909.13144v2, pp. 1-15 (Year: 2020).*
Markus Nagel et al., Data-Free Quantization Through Weight Equalization and Bias Correction, arXiv:1906.04721v3, 1-13 pages (Nov. 25, 2019).
Non-Final Office Action of Korean Patent application No. 10-2021-0074511, Korean Intellectual Property Office, Aug. 24, 2021.

* cited by examiner

*Primary Examiner* — Brent Johnston Hoover
(74) *Attorney, Agent, or Firm* — BROADVIEW IP LAW, PC

(57) ABSTRACT

A method for quantizing a deep neural network is provided, which includes extracting first statistical information on output values of a first normalization layer included in the deep neural network, determining a discretization interval associated with input values of a subsequent layer of the first normalization layer by using the extracted first statistical information, and quantizing the input values of the subsequent layer into discretized values having the determined discretization interval.

11 Claims, 10 Drawing Sheets

METHOD AND APPARATUS FOR QUANTIZING DEEP NEURAL NETWORK

CROSS-REFERENCE TO RELATED APPLICATION

This application claims priority under 35 U.S.C § 119 to Korean Patent Application No. 10-2021-0074511 filed in the Korean Intellectual Property Office on Jun. 9, 2021, the entire contents of which are hereby incorporated by reference.

TECHNICAL FIELD

The present disclosure relates to a method and apparatus for quantizing a deep neural network, and more particularly, to a method and apparatus for quantizing a deep neural network by using a normalization layer.

BACKGROUND

A large amount of computation may be required according to the size of data used for inference in a deep neural network, requiring a vast storage space for parameters, weights, and the like. Under this configuration, when the deep neural network is operated in a low-power device, it may be very important to reduce the amount of computation of the deep neural network as much as possible and to reduce the required storage space, that is, to reduce the weight of the deep neural network. For example, a network quantization technique may be used to lighten the deep neural network. In this example, network quantization may refer to a method of reducing bit precision of parameters and output value (e.g., activation output) of the deep neural network. Such quantization may be divided into Post-Training Quantization (PTQ) and Quantization Aware Training (QAT).

Meanwhile, training data used for training the deep neural network may be required for quantization of the output value and the like. For example, PTQ requires use of training data for calibration purposes to implement network quantization. However, it may be very difficult for a company that performed training of deep neural network by using the training data to share the training data used for training with a company that will perform quantization of the trained deep neural network.

SUMMARY

In order to solve the problems described above, the present disclosure provides a method, a computer program stored in a recording medium, and an apparatus (system) for quantizing a deep neural network.

The present disclosure may be implemented in a variety of ways, including a method, a device (system) or a computer program stored in a readable storage medium.

According to an embodiment, a method for quantizing a deep neural network used for inference is provided, in which the method may be performed by one or more processors and include extracting first statistical information on output values of a first normalization layer included in the deep neural network, determining a discretization interval associated with input values of a subsequent layer of the first normalization layer by using the extracted first statistical information, and quantizing the input values of the subsequent layer into discretized values having the determined discretization interval. The extracting the first statistical information may include extracting a first scale factor for one or more channels associated with the first normalization layer from information indicative of a distribution of the output values of the first normalization layer. The method further may include extracting, from information indicative of a distribution of output values of a second normalization layer disposed on a shortcut path included in the deep neural network and disposed before the subsequent layer, a second scale factor for one or more channels associated with the second normalization layer. The determining the discretization interval may include calculating a clipping value using the extracted first scale factor and the extracted second scale factor.

According to an embodiment, the deep neural network may be a model trained by using training data. The determining the discretization interval may include calculating the clipping value using the extracted first scale factor and the extracted second scale factor without requiring use of at least a portion of the training data for the deep neural network.

According to an embodiment, the second normalization layer may be indirectly connected to the subsequent layer, while there may be no separate normalization layer disposed between the subsequent layer and the second normalization layer.

According to an embodiment, the determining the discretization interval may include determining the discretization interval associated with the input values of the subsequent layer by using the calculated clipping value and a number of bits of data used for inference in the deep neural network.

According to an embodiment, the calculating the clipping value may include selecting a maximum value from among values calculated based on the first scale factor and the second scale factor for each of the one or more channels associated with the first normalization layer and the one or more channels associated with the second normalization layer, and calculating the clipping value by using the selected maximum value and a preset value corresponding to a performance equal to or greater than a predetermined reference.

According to an embodiment, the output values of the first normalization layer and the output values of the second normalization layer may have a normal distribution.

According to an embodiment, a number of bits of data used for training the deep neural network may be greater than a number of bits of data used for inference of the deep neural network.

A computer program is provided, which is stored on a non-transitory computer-readable recording medium for executing, on a computer, the method described above according to the embodiment.

A computing device according to an embodiment may include a memory storing one or more instructions, and a processor configured to execute the stored one or more instructions to: extract first statistical information on output values of a first normalization layer included in a deep neural network, determine a discretization interval associated with input values of a subsequent layer of the first normalization layer by using the extracted first statistical information, and quantize the input values of the subsequent layer into discretized values having the determined discretization interval. The processor is further configured to extract a first scale factor for one or more channels associated with the first normalization layer from information indicative of a distribution of the output values of the first normalization layer, extract, from information indicative of a distribution of output values of a second normalization layer disposed on a shortcut path included in the deep neural network and disposed before the subsequent layer, a second scale factor for one or more channels associated with the second normalization layer, and calculate a clipping value using the extracted first scale factor and the extracted second scale factor.

According to some embodiments, even when at least a portion of the training data of the trained deep neural network is not provided, the computing device may perform quantization by using the normalization layer of the deep neural network and maintain high inference performance.

According to some embodiments, compared to when a portion of the training data of the deep neural network is used so that data in a range not included in the portion of the training data can be ignored, by performing quantization by analyzing distribution information of the normalization layer, it is possible to constantly maintain the inference performance over a wider data range.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
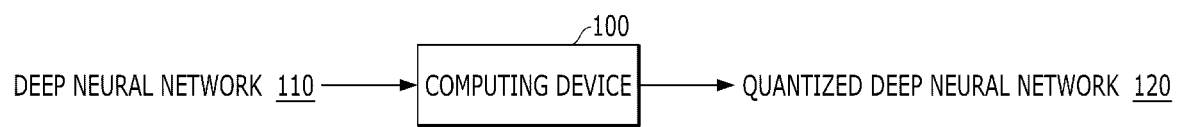
FIG. 1 is a diagram illustrating an example of a computing device performing quantization according to an embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various forms different from each other, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in specific cases, certain terms may be arbitrarily selected by the applicant, and the meaning of the terms will be described in detail in a corresponding description of the embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one computing device of a server device and a cloud device, but not limited thereto. For example, the system may include one or more server devices. In another example, the system may include one or more cloud devices. In still another example, the system may include both the server device and the cloud device operated in conjunction with each other.

In the present disclosure, a "deep neural network" may refer to any artificial neural network including an input layer, an output layer, and a plurality of hidden layers. In addition, the deep neural network may refer to any trained artificial neural network including one or more normalization layers.

In the present disclosure, the "artificial neural network model" is an example of the machine learning model, and may include any model used to infer an answer to a given input. According to an embodiment, the artificial neural network model may include a deep neural network including an input layer, a plurality of hidden layers, and an output layer. In an example, each layer may include one or more nodes. In addition, the artificial neural network model may include weights associated with a plurality of nodes included in the artificial neural network model. In an example, the weights may include any parameter that is associated with the artificial neural network model.

In the present disclosure, "quantization" may refer to conversion of original bit precision trained for the trained deep neural network into target bit precision of the corresponding hardware for execution on the target hardware. For example, when 32-bit floating-point model is quantized into 8-bit integer model, the inference performance of the deep neural network may be somewhat reduced, but the inference speed may be further improved. According to an embodiment, quantization may be divided into Post-Training Quantization (PTQ) and Quantization Aware Training (QAT). QAT may indicate a method that performs quantization when training a model, and PTQ may indicate a method that performs quantization on a trained model. In general, when performing quantization, QAT may require a significant amount of training data, and PTQ may require at least a portion of the training data for the purpose of calibration to analyze statistics on the output values of any layers.

In the present disclosure, the "subsequent layer" may refer to a layer connected after a specific normalization layer, based on the corresponding normalization layer among the layers included in the deep neural network. In this case, the subsequent layer may be any layer capable of processing the output values of the normalization layer, and it may be, for example, a Rectified Linear Unit (ReLU) layer, an identity layer, and the like that does not have a limit on the maximum value of the output value, but is not limited thereto. In an embodiment, the normalization layer may be directly connected to the subsequent layer. In another embodiment, the subsequent layer may be indirectly connected to the normalization layer, and there may not be a separate normalization layer disposed between the subsequent layer and the normalization layer. For example, a separate layer, which does not affect the statistics of the normalization layer or has an influence equal to or less than a predetermined reference, may be present between the normalization layer and the subsequent layer.

In the present disclosure, "instructions" may refer to one or more instructions grouped based on functions, which are the components of a computer program and executed by the processor.

FIG. 1 is a diagram illustrating an example of a computing device 100 performing quantization according to an embodiment. As illustrated, the computing device 100 may receive a deep neural network 110, and produce or update a quantized deep neural network 120. For example, the deep neural network 110 may be an artificial neural network trained based on original bit precision such as 32-bit floating-point or the like, and may be an artificial neural network including one or more normalization layers. In the present disclosure, quantization may refer to Post-Training Quantization (PTQ) type quantization that reduces bit precision (that is, converts original bit precision into target bit precision) based on trained artificial neural network.

In general, at least a portion of the training data may be required to perform PTQ. For example, in order to analyze statistical information of the output value of any layer, at least a portion of the training data may be used for calibration. However, since the computing device 100 uses statistical properties for each of the plurality of normalization layers included in the deep neural network 110, PTQ for the deep neural network 110 may be performed without requiring the use of at least a portion of the training data used for training.

According to an embodiment, when output values output from a previous layer (e.g., convolution layer, dense layer, and the like) connected to the normalization layer are input to the normalization layer, the normalization layer may convert or normalize input values into values in a specific range. For example, the normalization layer may refer to any layer that outputs normalized values of the input data, and may include batch normalization, layer normalization, instance normalization, and the like, for example, but is not limited thereto. For example, the normalization layer may be configured as expressed in Equation 1 below.

$$Y_i = \gamma_i \frac{X_i - \mu_{X_i}}{\sqrt{V_{X_i} + \epsilon}} + \beta_i \qquad \text{<Equation 1>}$$

where, i may denote each channel that forms the normalization layer, $X_i$ may denote an input value for each channel, and $Y_i$ may denote a normalized output value for each channel. In addition, $\beta_i$ may denote a shift factor for each channel, and $\gamma_i$ may denote a scale factor for each channel. The shift factor and/or the scale factor may be determined when the deep neural network 110 is trained, and may be used when the deep neural network 110 is quantized.

The computing device 100 may extract statistical information on the output values of the normalization layers (each of one or more normalization layers) included in the deep neural network 110. These output values of the normalization layers have a normal distribution, and the shift factor and/or the scale factor included in the normalization layer may include information on the shift and/or scale of the output values having the normal distribution. That is, the normalization layer (shift factor and/or scale factor associated with the normalization layer) may include the statistical information on the training data used during training of the deep neural network 110. That is, since the computing device 100 performs quantization on the deep neural network 110 by using this statistical information, the quantization may be performed while maintaining high performance without requiring the use of at least a portion of the training data.

The computing device 100 may determine the discretization interval associated with the input values of the subsequent layer of the normalization layer by using the extracted statistical information. To this end, the computing device 100 may determine a clipping value associated with the output values of the normalization layer from the extracted statistical information. Then, the computing device 100 may determine the discretization interval associated with the input values of the subsequent layer by using the determined clipping value and the number of bits of data used for inference in the deep neural network 110. The clipping value refers to a standard value for performing quantization based on the target bit precision, and may refer to a maximum value and/or a minimum value of a region to which the discretization interval are applied in the normalized graph, for example. Accordingly, the computing device 100 may partition a region between the clipping value and 0 into a specific number of regions at equal intervals based on the target bit precision to calculate a discontinuous value (e.g., an integer value) for mapping input values of the subsequent layer. In this case, the interval between each non-continuous values may be the discretization interval.

After determining the discretization interval, the computing device 100 may quantize input values of the subsequent layer into discretized values having the determined discretization interval. That is, the computing device 100 may quantize by converting the input values of the subsequent layer into values according to target bit precision. In FIG. 1, the process of performing quantization based on one normalization layer has been described above, but embodiments are not limited thereto, and the computing device 100 may perform quantization based on each of the plurality of normalization layers included in the deep neural network 110. With this configuration, without requiring the use of the training data of the trained deep neural network 110, the computing device 100 may perform quantization while maintaining high performance by using the normalization layer included in the deep neural network 110.

Figure 2:
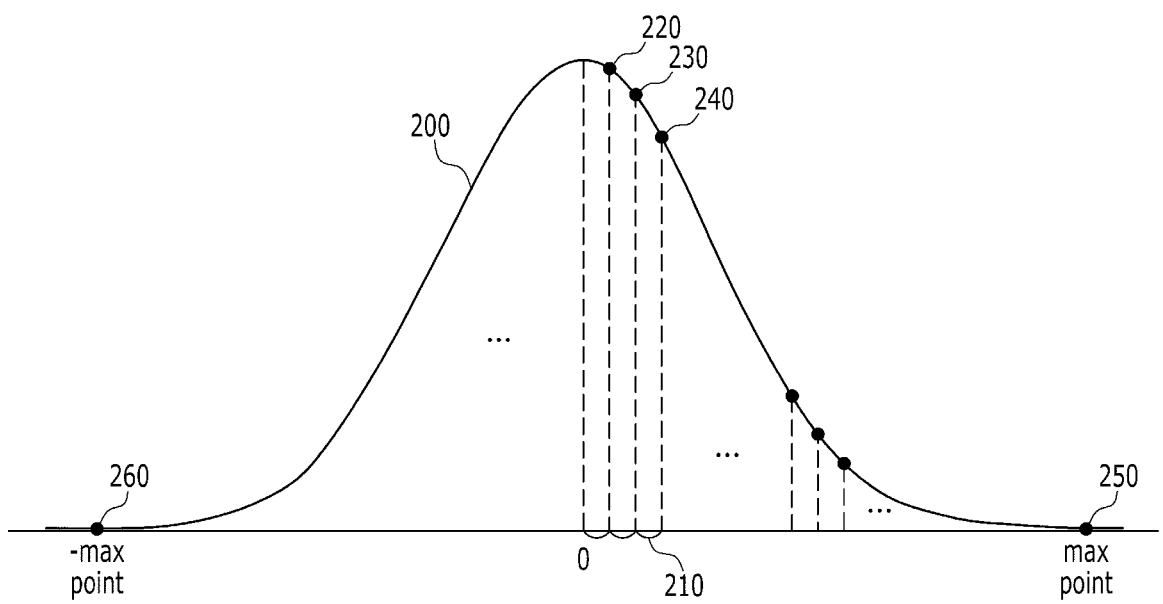
FIG. 2 is a diagram illustrating an example of determining a discretization interval based on a clipping value according to an embodiment.

FIG. 2 is a diagram illustrating an example of determining discretization interval 210 based on the clipping value 250 according to an embodiment. As described above, the computing device (e.g., 100 in FIG. 1) may extract statistical information on the output values of the normalization layer included in the deep neural network, and determine a first clipping value 250 and/or a second clipping value 260 associated with the output values of the normalization layer from the extracted statistical information. For example, the computing device 100 may also determine the discretization interval 210 for performing quantization based on the determined clipping values 250 and 260. For example, as illustrated in FIG. 2, the first clipping value 250 may indicate a positive maximum point (+max point) and the second clipping value 260 may indicate a negative maximum point (−max point).

According to an embodiment, input values 200 of the subsequent layer before quantization may be continuous values, such as a 32-bit floating-point model and the like. For example, on a graph for visually representing the distribution of input values and/or distribution of output values associated with the deep neural network, the input values 200 of the subsequent layer may be expressed as a continuous graph as illustrated.

To perform quantization, the computing device may determine a discretized value based on the clipping values 250 and 260. According to an embodiment, the computing device may determine the clipping values 250 and 260, and partition a region between the first clipping value 250 and the second clipping value 260 into a predetermined number of regions. For example, when quantizing a 8-bit integer model, the computing device may partition a region between the first clipping value 250 and the second clipping value 260 into 255 equally spaced regions. In another example, when quantizing a 4-bit integer model, the computing device may partition the region between the first clipping value 250 and the second clipping value 260 into 15 equally spaced regions. Then, the computing device may convert the partitioned input values between the first clipping value 250 and the second clipping value 260 into discretized values. The interval between each of the discretized values may be determined as the discretization interval 210. Under this method, as the clipping values 250 and 260 decrease, a smaller region is partitioned into a specific number of regions, resulting in narrower discretization interval 210, and while this can keep relatively higher inference performance, there can be relatively more input values outside the clipping values 250 and 260 and the high inference performance can not be ensured for these input values. Conversely, as the clipping values 250 and 260 increase, a larger region is partitioned into a specific number of regions, resulting in wider discretization interval 210. In this case, although the inference performance may be relatively degraded, the input values outside the clipping values 250 and 260 decrease relatively, and so the range of input values that can be covered through quantization can be widened.

In the present disclosure, it is described that the discretized value is determined by partitioning a region between two clipping values 250 and 260 into a predetermined number of regions, but embodiments are not limited thereto, and the range of discretized values varies according to the type of layer connected to the normalization layer. For example, when the ReLU-series function is connected to the normalization layer, the discretized value may be determined within a region between a positive clipping value (e.g., 250) and 0. As another example, when other non-linear functions such as Identity, leaky ReLU, and the like are connected with the normalization layer, the discretized value may have a value between the positive clipping value and the negative clipping value (e.g., between the first clipping value 250 and the second clipping value 260).

According to an embodiment, the input values 200 of the subsequent layer may be discretized according to the determined discretized value. For example, the input values 200 of the subsequent layer may be discretized into discretized values associated with each input value based on various types of criteria. According to an embodiment, among the input values between 0 and a first discretized value 220, an input value closer to 0 may be discretized as 0 and discretized as the first discretized value 220. Likewise, among the input values between the first discretized value 220 and a second discretized value 230, an input value closer to the first discretized value 220 may be discretized into the first discretized value 220, and an input value closer to the second discretized value 230 may be discretized into the second discretized value 230. In addition, among the input values between the second discretized value 230 and a third discretized value 240, an input value closer to the second discretized value 230 may be discretized into the second discretized value 230, and an input value closer to the third discretized value 240 may be discretized into the third discretized value 240. By the process described above, the computing device may determine the clipping values 250 and 260, determine discretized values based on the clipping values 250 and 260, and then change or convert the input values 200 of the subsequent layer to the determined discretized value to perform quantization.

Figure 3:
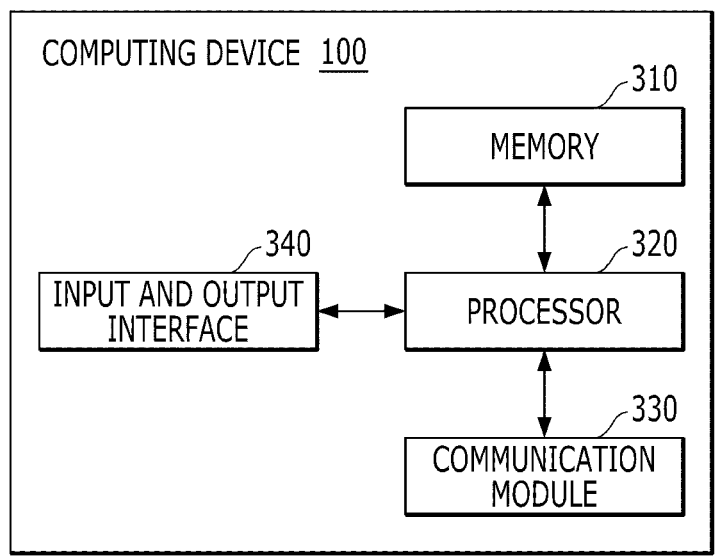
FIG. 3 is a block diagram of an internal configuration of the computing device according to an embodiment.

FIG. 3 is a block diagram of an internal configuration of the computing device 100 according to an embodiment. The computing device 100 may include a memory 310, a processor 320, a communication module 330, and an input and output interface 340. As illustrated in FIG. 3, the computing device 100 may be configured to communicate information and/or data through a network by using the communication 330.

The memory 310 may include any non-transitory computer-readable recording medium. According to an embodiment, the memory 310 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and the like may be included in the computing device 100 as a separate permanent storage device that is separate from the memory. In addition, the memory 310 may be stored with the operating system and at least one program code (e.g., codes for extracting statistical information on the output values of the normalization layer installed and driven in the computing device 100, determining the clipping value, determining the discretization interval, performing the quantization, and the like).

These software components may be loaded from a computer-readable recording medium separate from the memory 310. Such a separate computer-readable recording medium may include a recording medium directly connectable to the computing device 100, and may include a computer-readable recording medium such as a floppy drive, a disk, a tape, a DVD/CD-ROM drive, a memory card, and the like, for example. In another example, the software components may be loaded into the memory 310 through the communication module 330 rather than the computer-readable recording medium. For example, at least one program may be loaded into the memory 310 based on a computer program (e.g., a program for extracting statistical information on the output values of the normalization layer, determining the clipping value, determining the discretization interval associated with the input values of the subsequent layer, performing quantization of the input values of the subsequent layer, and the like) installed by the files provided by the developers or by a file distribution system that distributes the installation file of an application through the communication module 330.

The processor 320 may be configured to process the commands of the computer program by performing basic arithmetic, logic, and input and output operations. The commands may be provided to a user terminal (not illustrated) or another external system by the memory 310 or the communication module 330. For example, the processor 320 may extract the statistical information on the output values of the normalization layer included in the deep neural network. In addition, the processor 320 may determine the discretization interval subsequent to the normalization layer, that is, determine the discretization interval associated with the input values of the subsequent layer, by using the extracted statistical information. Then, the processor 320 may quantize the input values of the subsequent layer into discretized values having the determined discretization interval.

The communication module 330 may provide a configuration or function for the user terminal (not illustrated) and the computing device 100 to communicate with each other through a network, and may provide a configuration or function for the computing device 100 to communicate with an external system (e.g., a separate cloud system). For example, control signals, commands, data, and the like provided under the control of the processor 320 of the computing device 100 may be transmitted to the user terminal and/or the external system through the communication module 330 and the network through the communication module of the user terminal and/or external system. For example, the computing device 100 may provide information on input values of the quantized deep neural network and quantized subsequent layer, and the like to the user terminal and/or the external system through the communication module 330.

In addition, the input and output interface 340 of the computing device 100 may serve as a means for interfacing with a device (not illustrated) for input or output which may be connected to or included in the computing device 100. In FIG. 3, the input and output interface 340 is illustrated as a component configured separately from the processor 320, but embodiments are not limited thereto, and the input and output interface 340 may be configured to be included in the processor 320. The computing device 100 may include more components than those illustrated in FIG. 3. Meanwhile, most of the related components may not necessarily require exact illustration.

The processor 320 of the computing device 100 may be configured to manage, process, and/or store the information and/or data received from a plurality of user terminals and/or a plurality of external systems. According to an embodiment, the processor 320 may receive a trained deep neural network from the user terminal and/or the external system. In this case, the processor 320 may extract statistical information on the output values of the normalization layer included in the trained deep neural network, and use the extracted statistical information to determine the discretization interval associated with the input values of the subsequent layer of the normalization layer. Then, the processor 320 may quantize the input values of the subsequent layer into discretized values having the determined discretization interval.

Figure 4:
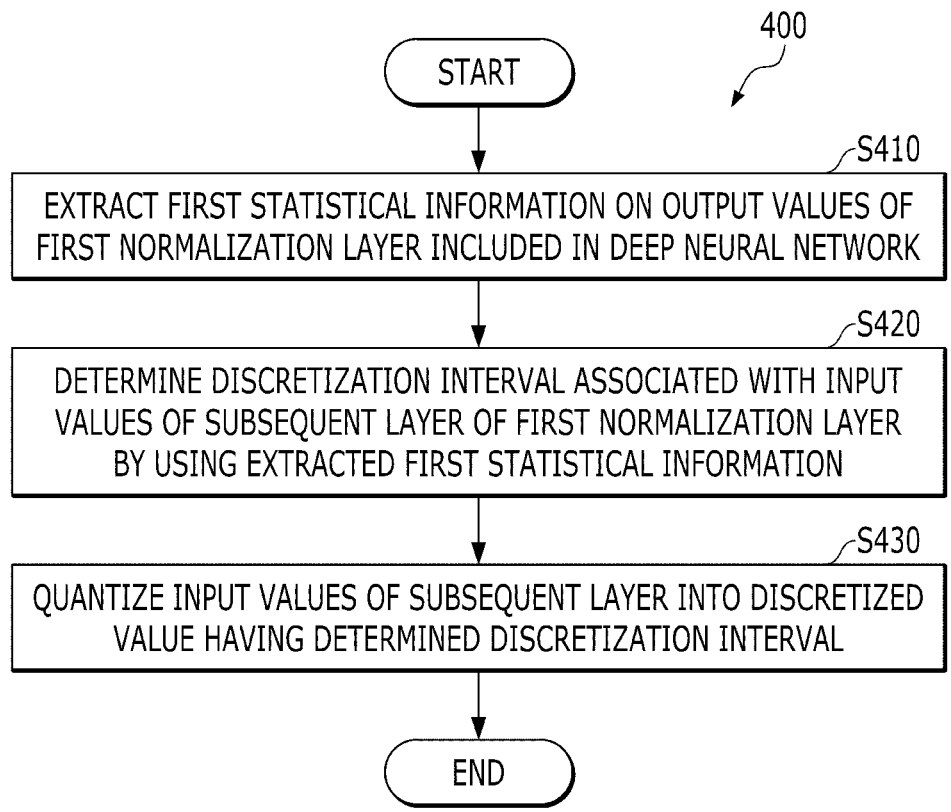
FIG. 4 is a flowchart illustrating a method for quantizing a deep neural network according to an embodiment.

FIG. 4 is a flowchart illustrating a method 400 for quantizing a deep neural network according to an embodiment. According to an embodiment, the method 400 for quantizing a deep neural network may be performed by a processor (e.g., one or more processors of the computing device). As illustrated, the method 400 for quantizing a deep neural network may be initiated by a processor extracting first statistical information on the output values of a first normalization layer included in the deep neural network, at S410. For example, the processor may extract a first scale factor for one or more channels associated with the first normalization layer from information indicative of a distribution of the output values of the first normalization layer. In this example, the deep neural network may represent a model trained by using the training data, and the output values of the first normalization layer may have a normal distribution. In addition, the number of bits of data used for training the deep neural network may be greater than the number of bits of data used for inference of the deep neural network.

The processor may determine the discretization interval associated with the input values of the subsequent layer of the first normalization layer by using the extracted first statistical information, at S420. In addition, the processor may quantize the input values of the subsequent layer into discretized values having a determined discretization interval, at S430. For example, the processor may determine the clipping value associated with a plurality of output values of the first normalization layer from the extracted first statistical information without requiring the use of at least a portion of the training data used for training the deep neural network. Then, the processor may determine the discretization interval associated with the input values of the subsequent layer by using the determined clipping value and the number of bits of data used for inference in the deep neural network.

According to an embodiment, the processor may extract the first scale factor for one or more channels associated with the first normalization layer from information indicative of a distribution of the output values of the first normalization layer. Among the extracted first scale factors, a maximum scale factor may be selected. Then, the processor may calculate a clipping value associated with the output values of the first normalization layer by using the selected maximum scale factor and a preset value corresponding to the performance equal to or greater than a predetermined reference. In addition, the processor may determine the discretization interval associated with the input values of the subsequent layer by using the calculated clipping value and the number of bits of data used for inference in the deep neural network.

Figure 5:
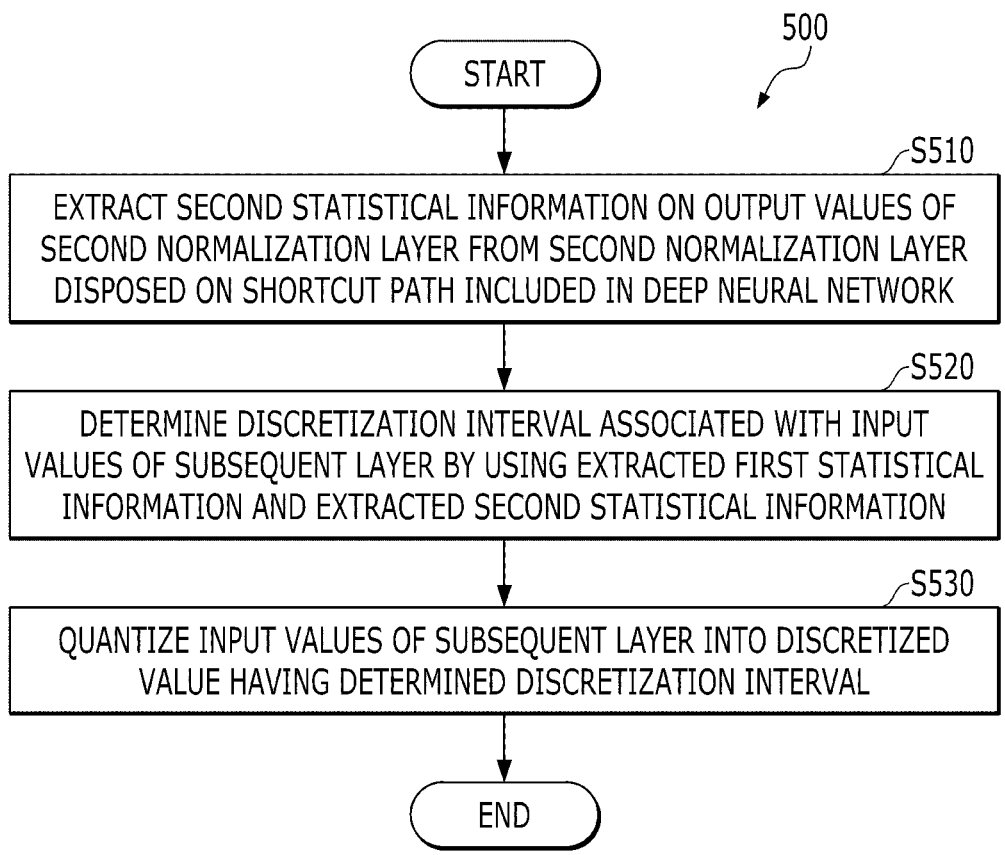
FIG. 5 is a flowchart illustrating a method for quantizing a deep neural network according to another embodiment.

FIG. 5 is a flow diagram illustrating a method 500 for quantizing a deep neural network according to another embodiment. The method 500 for quantizing a deep neural network may be performed by a processor (e.g., one or more processors of the computing device). As illustrated, the method 500 for quantizing a deep neural network may be initiated by the processor extracting, from a second normalization layer disposed on a shortcut path included in the deep neural network, second statistical information on the output values of the second normalization layer, at S510. The second normalization layer may refer to a layer disposed before the subsequent layer, and the shortcut path may refer to any path different from the path set as a main path in the deep neural network. For example, the processor may extract a second scale factor for one or more channels associated with the second normalization layer from information indicative of a distribution of the output values of the second normalization layer.

The first normalization layer described above in FIG. 4 may be disposed on the main path on the deep neural network, and the subsequent layer of the first normalization layer may represent the subsequent layer of the first normalization layer and the second normalization layer. Additionally or alternatively, the second normalization layer may be indirectly connected with this subsequent layer, and there may not be a separate normalization layer disposed between the subsequent layer and the second normalization layer.

The processor may determine the discretization interval associated with the input values of the subsequent layer by using the first statistical information extracted from the first normalization layer and the second statistical information on the output values of the second normalization layer, at S520. In addition, the processor may quantize the input values of the subsequent layer into discretized values having a determined discretization interval, at S530. The processor may select a maximum value from among the intermediate values calculated based on the first scale factor and the second scale factor for each of the one or more channels associated with the first normalization layer and the one or more channels associated with the second normalization layer. In addition, the processor may calculate the clipping value by using the selected maximum value and a preset value corresponding to a performance equal to or greater than a predetermined reference. In this case, the processor may determine the discretization interval associated with the input values of the subsequent layer by using the calculated clipping value and the number of bits of data to be used for inference in the deep neural network.

Figure 6:
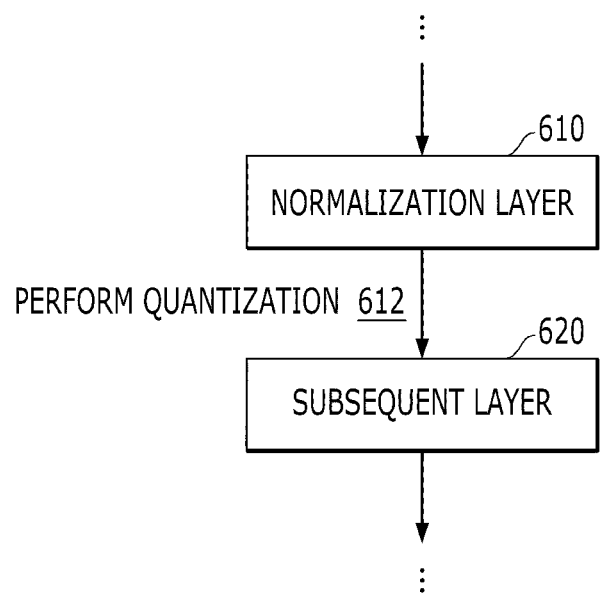
FIG. 6 is a diagram illustrating an example of quantization performed between sequentially connected normalization layer and subsequent layer according to an embodiment.

FIG. 6 is a diagram illustrating an example of quantization performed between sequentially connected normalization layer (610) and subsequent layer according to an embodiment. As illustrated, the normalization layer 610 may be sequentially connected to the subsequent layer 620. Although it is illustrated that the normalization layer 610 and the subsequent layer 620 are directly connected in FIG. 6, embodiments are not limited thereto, and any layer may be included between the normalization layer 610 and the subsequent layer 620. In this case, any layer included between the normalization layer 610 and the subsequent layer 620 may be a layer that does not affect the statistical information on the output values of the normalization layer 610 or has an influence equal to or less than a predetermined reference.

According to an embodiment, the computing device (e.g., 100 in FIG. 1) may extract the statistical information on the output values of the normalization layer 610 included in the deep neural network. In this case, the computing device may extract the scale factor for one or more channels associated with the normalization layer 610 from information indicative of a distribution of the output values of the normalization layer 610. For example, the computing device may extract a scale factor corresponding to $\gamma_i$ in Equation 1 described above with reference to FIG. 1.

The computing device may determine the discretization interval associated with the input values of the subsequent layer 620 of the normalization layer 610 by using the extracted statistical information. As described above, the computing device may determine the clipping value associated with the output values of the normalization layer 610 from the extracted statistical information without requiring the use of at least a portion of the training data used for training the deep neural network. Then, the discretization interval associated with the input values of the subsequent layer 620 may be determined by using the determined clipping value and the number of bits of data used for inference in the deep neural network.

According to an embodiment, the computing device may select a maximum scale factor from among the extracted scale factors for each channel. In addition, the computing device may calculate the clipping value associated with the output values of the normalization layer 610 by using the selected maximum scale factor and a preset value corresponding to a performance equal to or greater than the predetermined reference. For example, the clipping value (e.g., a positive maximum point) may be calculated by Equation 2 below. In addition, another clipping value (e.g., a negative maximum point) may be determined based on the clipping value calculated by Equation 3. For example, a negative value of the clipping value calculated by Equation 2 may be set as a negative maximum point.

$$S = \sigma * \max_i \gamma_i \qquad \text{<Equation 2>}$$

where, i may denote each channel that forms the normalization layer 610, σ may denote a variable associated with quantization performance, and S may denote the clipping value. In addition, $\gamma_i$ may represent the scale factor for each channel in Equation 1 described above. For example, according to Equation 2, when it is assumed that the output value of the normalization layer 610 has a normal distribution, when σ is 3, 99.7% of the input values of the subsequent layer 620 may be lower than the clipping value, and when σ is 4 or higher, 99.99% or more of the input values of the subsequent layer 620 may be lower than the clipping value.

According to an embodiment, in order to include more input values, it is possible to stably maintain high quantization performance when σ is maintained between 3 and 4, rather than when σ is set to a higher value of 4 or higher. That is, since the input values of the subsequent layer 620 have a normal distribution, when σ is maintained between 3 and 4, 99.7% to 99.99% of the input values are lower than the clipping value and the discretization interval can also be minimized, and accordingly, high performance can be maintained. Accordingly, quantization can be performed by using the scale factor of the normalization layer, while maintaining the high performance of the deep neural network.

According to an embodiment, the computing device may determine the discretization interval associated with the input values of the subsequent layer 620 by using the calculated clipping value and the number of bits of data used for inference in the deep neural network. Then, the computing device may quantize (612) the input values of the subsequent layer 620 into discretized values having the determined discretization interval. When using a portion of the training data of the deep neural network, data in a range that is not included in the portion of the training data may be ignored, whereas, when quantization is performed based on the statistical information described above, inference performance can be constantly maintained up to a data range of a region not included in the portion of the training data.

Figure 7:
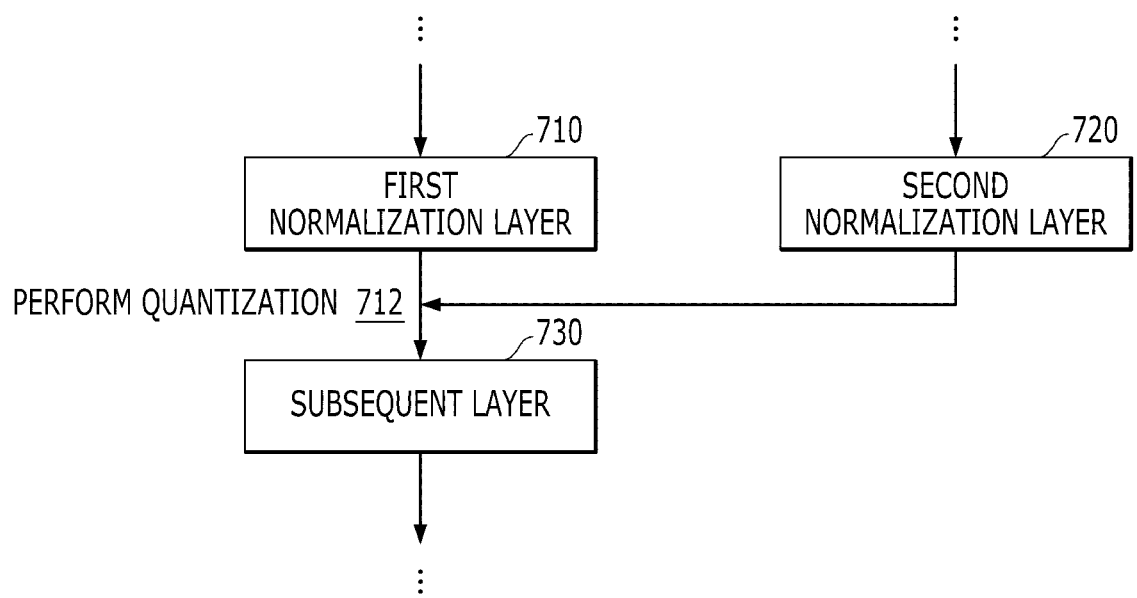
FIG. 7 is a diagram illustrating an example of quantization performed between a first normalization layer, a second normalization layer, and a subsequent layer according to an embodiment.

FIG. 7 is a diagram illustrating an example of quantization performed between a first normalization layer 710, a second normalization layer 720, and a subsequent layer 730 according to an embodiment. As illustrated, the first normalization layer 710 and the second normalization layer 720 may be connected to the subsequent layer 730. For example, the first normalization layer 710 may be disposed on a main path in the deep neural network, and the second normalization layer 720 may be disposed on a shortcut path on the deep neural network. The output value of the first normalization layer 710 and the output value of the second normalization layer 720 may be correlated to each other and used as an input value of the subsequent layer 730.

FIG. 7 illustrates that the first normalization layer 710 and the subsequent layer 730 are directly connected to each other, and the second normalization layer 720 and the subsequent layer 730 are directly connected to each other, but embodiments are not limited thereto, and any layer may be included between the first normalization layer 710 and the subsequent layer 730 and/or between the second normalization layer 720 and the subsequent layer 730. In this case, any layer may be a layer that does not affect the statistical information on the output values of the first normalization layer 710 and/or second normalization layer 720 or has an influence equal to or less than a predetermined reference.

The computing device may extract the first statistical information on the output values of the first normalization layer 710 included in the deep neural network, and extract the second statistical information on the output values of the second normalization layer. In this case, the computing device may extract the first scale factor for one or more channels associated with the first normalization layer 710 from information indicative of a distribution of the output values of the first normalization layer 710. Likewise, the computing device may extract the second scale factor for one or more channels associated with the second normalization layer 720 from information indicative of a distribution of the output values of the second normalization layer 720.

The computing device may determine the discretization interval associated with the input values of the subsequent layer 730 by using the extracted first statistical information and the extracted second statistical information. As described above, the computing device may determine the clipping value from the extracted first and second statistical information without requiring the use of at least a portion of the training data used for training the deep neural network, and determine the discretization interval associated with the input values of the subsequent layer 730 by using the determined clipping value and the number of bits of data used for inference in the deep neural network.

According to an embodiment, the computing device may select a maximum value from among the calculated intermediate values based on the first scale factor and the second scale factor for each of the one or more channels associated with the first normalization layer 710 and the one or more channels associated with the second normalization layer 720. In addition, the computing device may calculate the clipping value by using the selected maximum value and a preset value corresponding to a performance equal to or greater than a predetermined reference. For example, the clipping value (e.g., a positive maximum point) may be calculated by Equation 3 below. In addition, another clipping value (e.g., a negative maximum point) may be determined based on the clipping value calculated by Equation 3. For example, a negative value of the clipping value calculated by Equation 3 may be set as a negative maximum point.

$$S = \sigma * \max_i \sqrt{\gamma_{1,i}^2 + \gamma_{2,i}^2 + 2\gamma_{1,i}\gamma_{2,i}} \qquad \text{<Equation 3>}$$

where, i may denote each channel that forms the first normalization layer 710 and/or the second normalization layer 720, and σ may denote a variable associated with quantization performance, and S may denote the clipping value. In addition, $\gamma_{1,i}$ may denote the scale factor for each channel of the first normalization layer 710, and $\gamma_{2,i}$ may denote the scale factor for each channel of the second normalization layer 720. For example, according to Equation 3, when it is assumed that the output values of the first normalization layer 710 and/or second normalization layer 720 have a normal distribution, when σ is 3, 99.7% of the input values of the subsequent layer 730 may be lower than the clipping value, and when σ is 4 or higher, 99.99% or more of the input values of the subsequent layer 730 are lower than the clipping value.

In an embodiment, in order to include more input values, it is possible to stably maintain high quantization performance when σ is maintained between 3 and 4, rather than when σ is set to a higher value of 4 or higher. That is, since the input values of the subsequent layer 620 have a normal distribution, when σ is maintained between 3 and 4, 99.7% to 99.99% of the input values are lower than the clipping value and the discretization interval can also be minimized, and accordingly, high performance can be maintained. Accordingly, quantization can be performed by using the scale factors of the first normalization layer 710 and the second normalization layer 720, while maintaining the high performance of the deep neural network.

According to an embodiment, the computing device may determine the discretization interval associated with the input values of the subsequent layer 730 by using the calculated clipping value and the number of bits of data to be used for inference in the deep neural network. Then, the computing device may quantize (712) the input values of the subsequent layer 730 into discretized values having the determined discretization interval.

Figure 8:
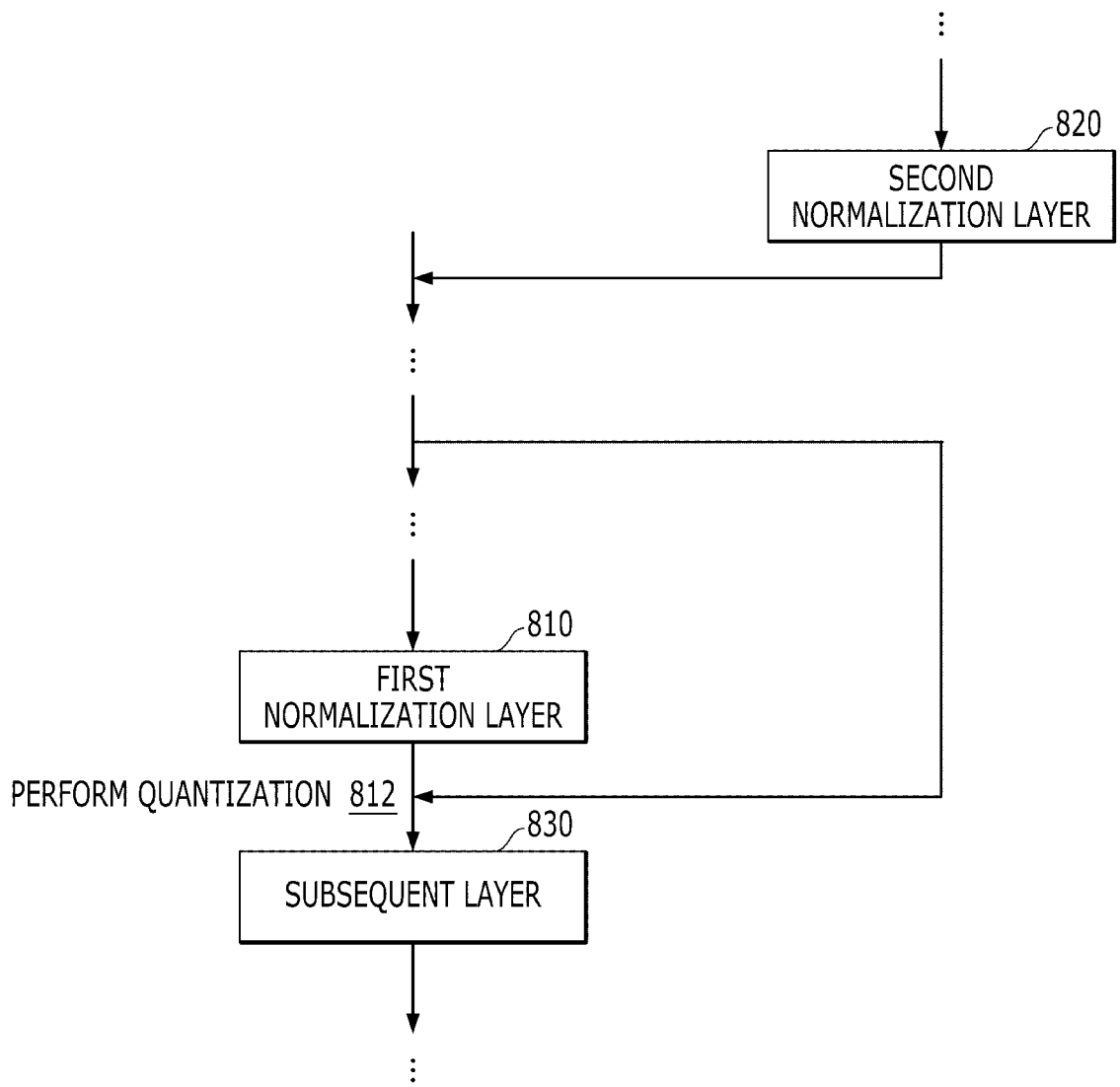
FIG. 8 is a diagram illustrating an example of quantization performed between a first normalization layer, an indirectly connected second normalization layer, and a subsequent layer according to an embodiment.

FIG. 8 is a diagram illustrating an example of quantization performed between a first normalization layer 810, an indirectly connected second normalization layer 820, and a subsequent layer 830 according to an embodiment. As illustrated, the first normalization layer 810 and the second normalization layer 820 may be connected to the subsequent layer 830. For example, the first normalization layer 810 may be disposed on a main path in the deep neural network, and the second normalization layer 820 may be disposed on a shortcut path on the deep neural network.

In the illustrated example, the second normalization layer 820 may be indirectly connected to the subsequent layer 830 of the first normalization layer 810 and the second normalization layer 820, but there may be no separate normalization layer disposed between the subsequent layer 830 and the second normalization layer 820. That is, the statistical characteristics of the output values of the second normalization layer 820 may be maintained until they are used in the subsequent layer 830. Accordingly, even when each layer is connected, the clipping value can be calculated by Equation 3 as described above with reference to FIG. 7. That is, when it is assumed that the output values of the first normalization layer 810 and/or second normalization layer 820 have a normal distribution, when σ is 3, 99.7% of the input values of the subsequent layer 830 may be lower than the clipping value, and when σ is 4 or higher, 99.99% or more of the input values of the subsequent layer 830 are lower than the clipping value.

According to an embodiment, the computing device may determine the discretization interval associated with the input values of the subsequent layer 830 by using the calculated clipping value and the number of bits of data to be used for inference in the deep neural network. Then, the computing device may quantize (812) the input values of the subsequent layer 830 into discretized values having the determined discretization interval.

Figure 9:
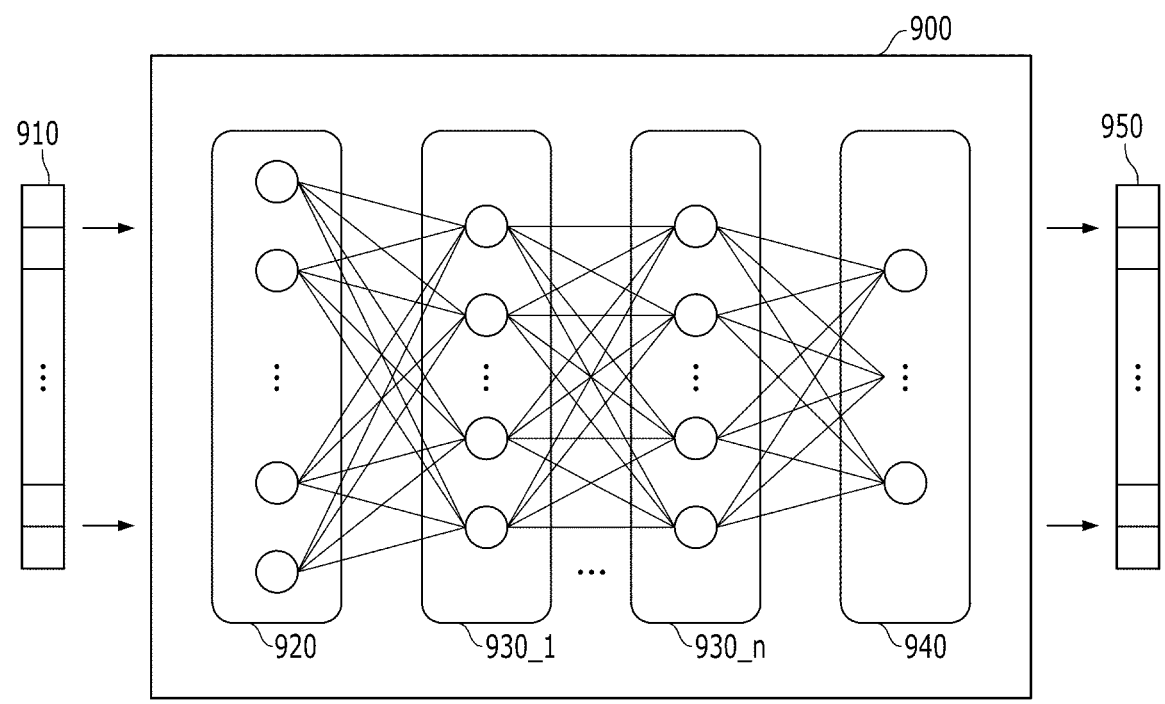
FIG. 9 is an exemplary diagram illustrating an artificial neural network model according to an embodiment.

FIG. 9 is an exemplary diagram illustrating an artificial neural network model 900 according to an embodiment. In machine learning technology and cognitive science, the artificial neural network model 900 as an example of the machine learning model refers to a statistical learning algorithm implemented based on a structure of a biological neural network, or to a structure that executes such algorithm.

According to an embodiment, the artificial neural network model 900 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 900 may include any probability model, neural network model, and the like, that is used in artificial intelligence learning methods such as machine learning and deep learning, and may include a model associated with the deep neural network described above.

The artificial neural network model 900 is implemented as a multilayer perceptron (MLP) formed of multiple nodes and connections between them. The artificial neural network model 900 according to an embodiment may be implemented by using one of various artificial neural network model structures including the MLP. As illustrated in FIG. 9, the artificial neural network model 900 includes an input layer 920 to receive an input signal or data 910 from the outside, an output layer 940 to output an output signal or data 950 corresponding to the input data, and (n) number of hidden layers 930_1 to 930_n (where n is a positive integer) positioned between the input layer 920 and the output layer 940 to receive a signal from the input layer 920, extract the features, and transmit the features to the output layer 940. In an example, the output layer 940 receives signals from the hidden layers 930_1 to 930_n and outputs them to the outside.

The method of training the artificial neural network model 900 includes the supervised learning that trains to optimize for solving a problem with inputs of teacher signals (correct answers), and the unsupervised learning that does not require a teacher signal. For example, the artificial neural network model 900 associated with the deep neural network may be a model trained with the training data by the supervised and/or unsupervised learning. The artificial neural network model 900 trained as described above may be stored in a memory (not illustrated) of the computing device, and the computing device may perform quantization on the artificial neural network model 900. For example, the computing device may quantize weights, output values, and/or input values of the artificial neural network model 900 trained with 32-bit floating-point value into discretized values (e.g., integers).

According to an embodiment, the computing device may perform quantization on the artificial neural network model 900 without using the training data used for training the artificial neural network model 900. For example, the artificial neural network model 900 may include a plurality of normalization layers, and quantization may be performed on the input values of the subsequent layer of each normalization layer. In this case, the computing device may perform quantization on the output values (the activation outputs) and the like by using the statistical characteristic of the normalization layer (the scale factor of the normalization layer). In other words, the computing device may determine the clipping value associated with a plurality of output values of the normalization layer from the statistical information extracted from the normalization layer without requiring the use of at least a portion of the training data used for training the artificial neural network model 900, and determine the discretization interval associated with the input values of the subsequent layer by using the determined clipping value and the number of bits of data used for inference in the artificial neural network model 900.

Figure 10:
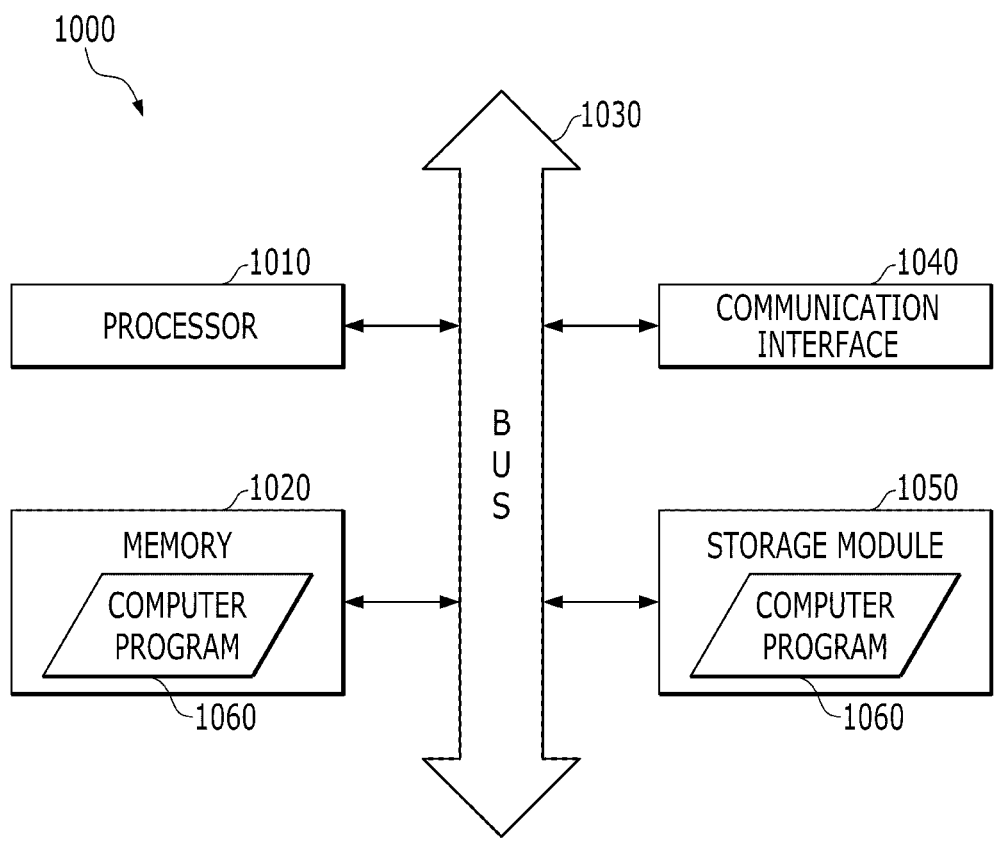
FIG. 10 is a block diagram of any computing device associated with quantization of a deep neural network according to an embodiment.

FIG. 10 is a block diagram of any computing device 1000 associated with quantization of a deep neural network according to an embodiment. As illustrated, the computing device 1000 may include one or more processors 1010, a bus 1030, a communication interface 1040, a memory 1020 for loading a computer program 1060 to be performed by the processors 1010, and a storage module 1050 for storing the computer program 1060. Meanwhile, FIG. 10 illustrates only the components related to the embodiment. Accordingly, those of ordinary skill in the art to which the present disclosure pertains will be able to recognize that other general-purpose components may be further included in addition to the components illustrated in FIG. 10.

The processors 1010 control the overall operation of each component of the computing device 1000. The processors 1010 may be configured to include a central processing unit (CPU), a micro processor unit (MPU), a micro controller unit (MCU), a graphic processing unit (GPU), or any type of processor well known in the technical field of the present disclosure. In addition, the processors 1010 may perform an arithmetic operation on at least one application or program for executing the method according to the embodiments of the present disclosure. The computing device 1000 may include one or more processors.

The memory 1020 may store various types of data, commands, and/or information. The memory 1020 may load one or more computer programs 1060 from the storage module 1050 in order to execute the method/operation according to various embodiments of the present disclosure. The memory 1020 may be implemented as a volatile memory such as RAM, but the technical scope of the present disclosure is not limited thereto.

The bus 1030 may provide a communication function between components of the computing device 1000. The bus 1030 may be implemented as various types of buses such as an address bus, a data bus, a control bus, or the like.

The communication interface 1040 may support wired/wireless Internet communication of the computing device 1000. In addition, the communication interface 1040 may support various other communication methods in addition to the Internet communication. To this end, the communication interface 1040 may be configured to include a communication module well known in the technical field of the present disclosure.

The storage module 1050 may non-temporarily store one or more computer programs 1060. The storage module 1050 may be configured to include a nonvolatile memory such as a read only memory (ROM), an erasable programmable ROM (EPROM), an electrically erasable programmable ROM (EEPROM), a flash memory, and the like, a hard disk, a detachable disk, or any type of computer-readable recording medium well known in the art to which the present disclosure pertains.

The computer program 1060 may include one or more instructions that, when loaded into the memory 1020, cause the processors 1010 to perform an operation/method in accordance with various embodiments of the present disclosure. That is, the processors 1010 may perform operations/methods according to various embodiments of the present disclosure by executing one or more instructions.

For example, the computer program 1060 may include instructions for extracting first statistical information on output values of a first normalization layer included in a deep neural network, determining, by the processor, a discretization interval associated with input values of a subsequent layer of the first normalization layer by using the extracted first statistical information, and quantizing input values of the subsequent layer into discretized values having the determined discretization interval.

The above description of the present disclosure is provided to enable those skilled in the art to make or use the present disclosure. Various modifications of the present disclosure will be readily apparent to those skilled in the art, and the general principles defined herein may be applied to various modifications without departing from the spirit or scope of the present disclosure. Thus, the present disclosure is not intended to be limited to the examples described herein but is intended to be accorded the broadest scope consistent with the principles and novel features disclosed herein.

Although example implementations may refer to utilizing aspects of the presently disclosed subject matter in the context of one or more standalone computer systems, the subject matter is not so limited, and they may be implemented in conjunction with any computing environment, such as a network or distributed computing environment. Furthermore, aspects of the presently disclosed subject matter may be implemented in or across a plurality of processing chips or devices, and storage may be similarly influenced across a plurality of devices. Such devices may include PCs, network servers, and handheld devices.

Although the present disclosure has been described in connection with certain embodiments herein, it should be understood that various modifications and changes can be made without departing from the scope of the present disclosure, which can be understood by those skilled in the art to which the present disclosure pertains. Further, such modifications and changes are intended to fall within the scope of the claims appended herein.

The invention claimed is:

1. A method for optimizing a digital bit-precision of an artificial neural network model used for inference, the method performed by processing circuitry, comprising:
receiving an artificial neural network model including a plurality of normalization layers;
extracting statistical information on output values of a first normalization layer included in the received artificial neural network model;
determining a discretization interval associated with input values of a subsequent layer of the first normalization layer by using the extracted statistical information;
quantizing the artificial neural network model to reduce bit precision of parameters and output values, and to reduce an inference performance of the artificial neural network model and to improve an inference speed of the artificial neural network model by converting an original digital bit-precision of the input values of the subsequent layer for a trained artificial neural network model into a target digital bit-precision of discretized values having the determined discretization interval for a target hardware, wherein the original digital bit-precision is reduced to the target digital bit-precision to increase the inference speed; and
outputting the quantized artificial neural network model for the target hardware,
wherein the extracting the statistical information includes extracting a first scale factor for one or more channels associated with the first normalization layer from information indicative of a distribution of the output values of the first normalization layer,
the method further comprising extracting, from information indicative of a distribution of output values of a second normalization layer disposed on a shortcut path included in the artificial neural network model and disposed before the subsequent layer, a second scale factor for one or more channels associated with the second normalization layer, wherein the artificial neural network model is a model trained by using training data and is a multilayer perceptron (MLP) formed of multiple nodes and connections between the nodes, wherein the artificial neural network includes an input layer that receives an input signal, an output layer that outputs an output signal and a number of hidden layers positioned between the input layer and the output layer that receives a signal from the input layer, extracts features, and transmits the features to the output layer, wherein the training comprises repeatedly adjusting the weights of synapses by the nodes forming the MLP to reduce errors between a target output corresponding to a specific input and a deduced output, wherein the determining the discretization interval includes calculating a first clipping value and a second clipping value using the extracted first scale factor and the extracted second scale factor without requiring use of the training data for the artificial neural network model, determining the discretization interval by using the first clipping value and the second clipping value based on a number of bits of data used for inference of the artificial neural network model, and partitioning a region between the first clipping value and the second clipping value into a specific number of regions at equal intervals based on the target digital-bit precision to calculate a discontinuous value for mapping the input values of the subsequent layer such that the interval between each non-continuous value is the discretization interval.

2. The method according to claim 1, wherein the second normalization layer is indirectly connected to the subsequent layer, while there is no separate normalization layer disposed between the subsequent layer and the second normalization layer.

3. The method according to claim 1, wherein the calculating the first clipping value and the second clipping value includes:

selecting a maximum value from among values calculated based on the first scale factor and the second scale factor for each of the one or more channels associated with the first normalization layer and the one or more channels associated with the second normalization layer; and calculating the first clipping value and the second clipping value by using the selected maximum value and a preset value corresponding to a performance equal to or greater than a predetermined reference.

4. The method of claim 1, wherein the output values of the first normalization layer and the output values of the second normalization layer have a normal distribution.

5. The method according to claim 1, wherein a number of bits of data used for training the artificial neural network model is greater than the number of bits of data used for inference of the artificial neural network model.

6. A computer program product stored in a non-transitory computer readable recording medium for executing, on a computer, the method according to claim 1.

7. A computing device, comprising:
a memory storing one or more instructions; and
processing circuitry configured to execute the stored one or more instructions to:
receive an artificial neural network model including an input layer, an output layer, and a plurality of hidden layers;

extract statistical information on output values of a first normalization layer included in the received artificial neural network model;

determine a discretization interval associated with input values of a subsequent layer of the first normalization layer by using the extracted statistical information;

quantize the artificial neural network model to reduce bit precision of parameters and output values, and to reduce an inference performance of the artificial neural network model and to improve an inference speed of the artificial neural network model by converting an original digital bit-precision of the input values of the subsequent layer for a trained artificial neural network model into a target digital bit-precision of discretized values having the determined discretization interval for a target hardware, wherein the original digital bit-precision is reduced to the target digital bit-precision to increase the inference speed; and output the quantized artificial neural network model for the target hardware, wherein the processing circuitry is further configured to:

extract a first scale factor for one or more channels associated with the first normalization layer from information indicative of a distribution of the output values of the first normalization layer;

extract, from information indicative of a distribution of output values of a second normalization layer disposed on a shortcut path included in the artificial neural network model and disposed before the subsequent layer, a second scale factor for one or more channels associated with the second normalization layer;

calculate a first clipping value and a second clipping value using the extracted first scale factor and the extracted second scale factor without requiring use of the training data for the artificial neural network model;

determine the discretization interval by using the first clipping value and the second clipping value based on a number of bits of data used for inference of the artificial neural network model; and partitioning a region between the first clipping value and the second clipping value into a specific number of regions at equal intervals based on the target digital-bit precision to calculate a discontinuous value for mapping the input values of the subsequent layer such that the interval between each non-continuous value is the discretization interval, wherein the artificial neural network model is a model training by using the training data and is a multilayer perceptron (MLP) formed of multiple nodes and connections between the nodes, wherein the artificial neural network includes the input layer that receives an input signal, the output layer that outputs an output signal and the plurality of hidden layers positioned between the input layer and the output layer that receives a signal from the input layer, extracts features, and transmits the features to the output layer, wherein the training comprises repeatedly adjusting weights of synapses by the nodes forming the MLP to reduce errors between a target output corresponding to a specific input and a deduced output.

8. The computing device according to claim 7, wherein the processing circuitry is further configured to calculate the first clipping value and the second clipping value using the extracted first scale factor and the extracted second scale factor without requiring use of at least a portion of the training data for the artificial neural network model.

9. The computing device according to claim 7, wherein the processing circuitry is further configured to:
   select a maximum value from among values calculated based on the first scale factor and the second scale factor for each of the one or more channels associated with the first normalization layer and the one or more channels associated with the second normalization layer; and
   calculate the first clipping value and the second clipping value by using the selected maximum value and a preset value corresponding to a performance equal to or greater than a predetermined reference.

10. The computing device according to claim 7, wherein the output values of the first normalization layer and the output values of the second normalization layer have a normal distribution.

11. The computing device according to claim 7, wherein a number of bits of data used for training the artificial neural network model is greater than the number of bits of data used for inference of the artificial neural network model.

* * * * *